United States Patent
Kobus et al.

(10) Patent No.: US 9,879,742 B2
(45) Date of Patent: Jan. 30, 2018

(54) VIBRATION DAMPER

(71) Applicant: SÜDDEUTSCHE GELENKSCHEIBENFABRIK GMBH & CO. KG, Waldkraiburg (DE)

(72) Inventors: Franz Kobus, Jettenbach (DE); Ralf Luedtke, Schechen (DE); Claus Reiter, Muehldorf (DE)

(73) Assignee: SÜDDEUTSCHE GELENKSCHEIBENFARBIK GMBH & CO. KG, Waldkraiburg (DE)

( * ) Notice: Subject to any disclaimer, the term of this patent is extended or adjusted under 35 U.S.C. 154(b) by 0 days.

(21) Appl. No.: 14/799,476

(22) Filed: Jul. 14, 2015

(65) Prior Publication Data

US 2016/0017949 A1    Jan. 21, 2016

(30) Foreign Application Priority Data

Jul. 15, 2014 (DE) .................... 20 2014 005 767 U

(51) Int. Cl.
*F16F 7/108* (2006.01)
(52) U.S. Cl.
CPC .......... *F16F 7/108* (2013.01); *F16F 2222/08* (2013.01); *F16F 2230/0023* (2013.01)
(58) Field of Classification Search
CPC ............. F16F 7/104; F16F 7/108; F16F 15/02
USPC ................................ 267/141.1; 188/378, 380
See application file for complete search history.

(56) References Cited

U.S. PATENT DOCUMENTS

| | | | | |
|---|---|---|---|---|
| 1,737,048 A | * | 11/1929 | Hunt | B62D 7/22 188/380 |
| 1,937,581 A | * | 12/1933 | Lord | F16F 1/38 248/612 |
| 4,641,732 A | * | 2/1987 | Andry | F16F 7/108 188/379 |
| 4,848,756 A | * | 7/1989 | Funahashi | F16F 13/14 267/140.12 |
| 6,341,766 B1 | * | 1/2002 | Stiller | F16F 13/18 267/140.13 |
| 2005/0133325 A1 | * | 6/2005 | Kuwayama | F16F 7/108 188/379 |
| 2008/0169592 A1 | * | 7/2008 | Adams | F16F 13/108 267/140.13 |

(Continued)

FOREIGN PATENT DOCUMENTS

DE          10041993 C1 *  5/2002  ............. F16F 7/108
DE    10 2005 009 677 B4    9/2006

(Continued)

*Primary Examiner* — Melanie Torres Williams
(74) *Attorney, Agent, or Firm* — Moore & Van Allen PLLC; Henry B. Ward, III

(57) ABSTRACT

The present invention relates to a vibration damper (10) for damping vibrations in a vehicle, in particular for damping bending vibrations, having:
- at least one vibrating weight (12),
- at least one fastening means (14), and
- at least one elastic connecting means (16), which connects the at least one vibrating weight (12) to the at least one fastening means (14), wherein at least one stop device (AE) is provided, which in damping fashion limits a deflection of the vibrating weight (12) along the longitudinal axis (M) of the vibration damper (10).

15 Claims, 15 Drawing Sheets

(56) References Cited

U.S. PATENT DOCUMENTS

2014/0291094 A1* 10/2014 Goetz ................. F16F 7/108
                                                                                               188/380

FOREIGN PATENT DOCUMENTS

| DE | 102011004459 A1 * | 8/2012 | ............ F16F 7/108 |
|---|---|---|---|
| DE | 10 2013 103 110 A1 | 10/2014 | |
| DE | 10 2013 104 034 A1 | 10/2014 | |
| EP | 1435472 A1 * | 7/2004 | ............ F16F 7/108 |

* cited by examiner

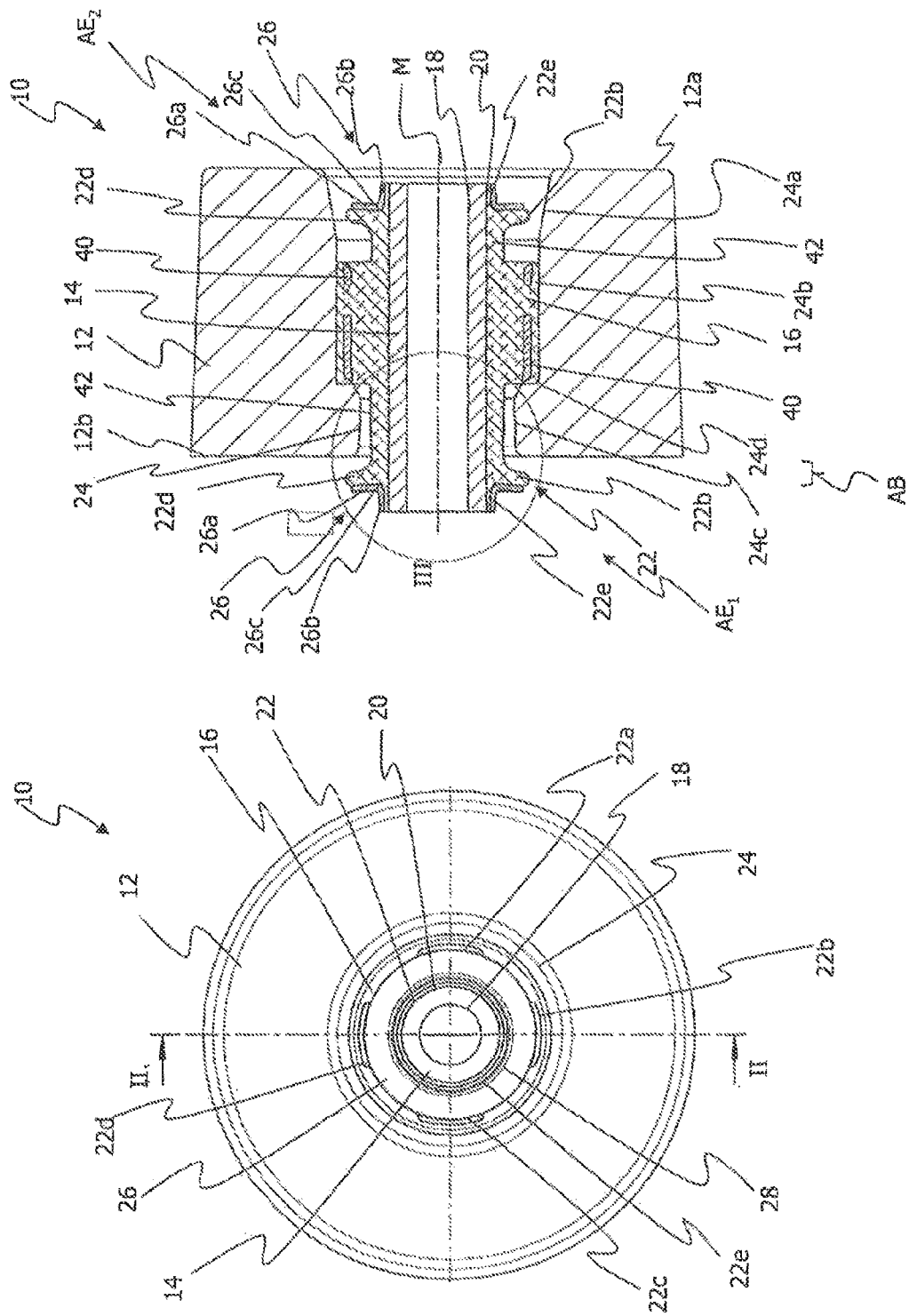

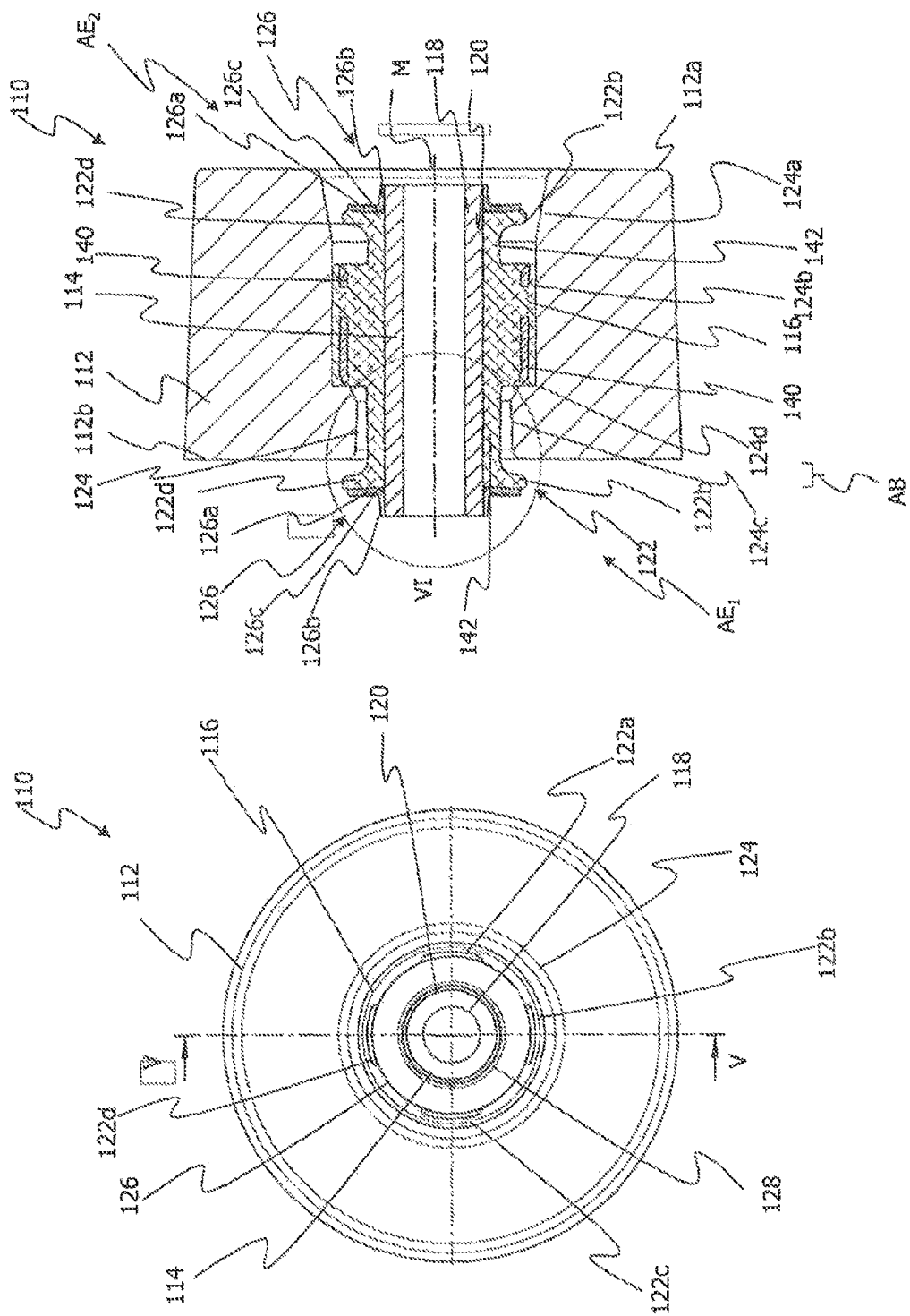

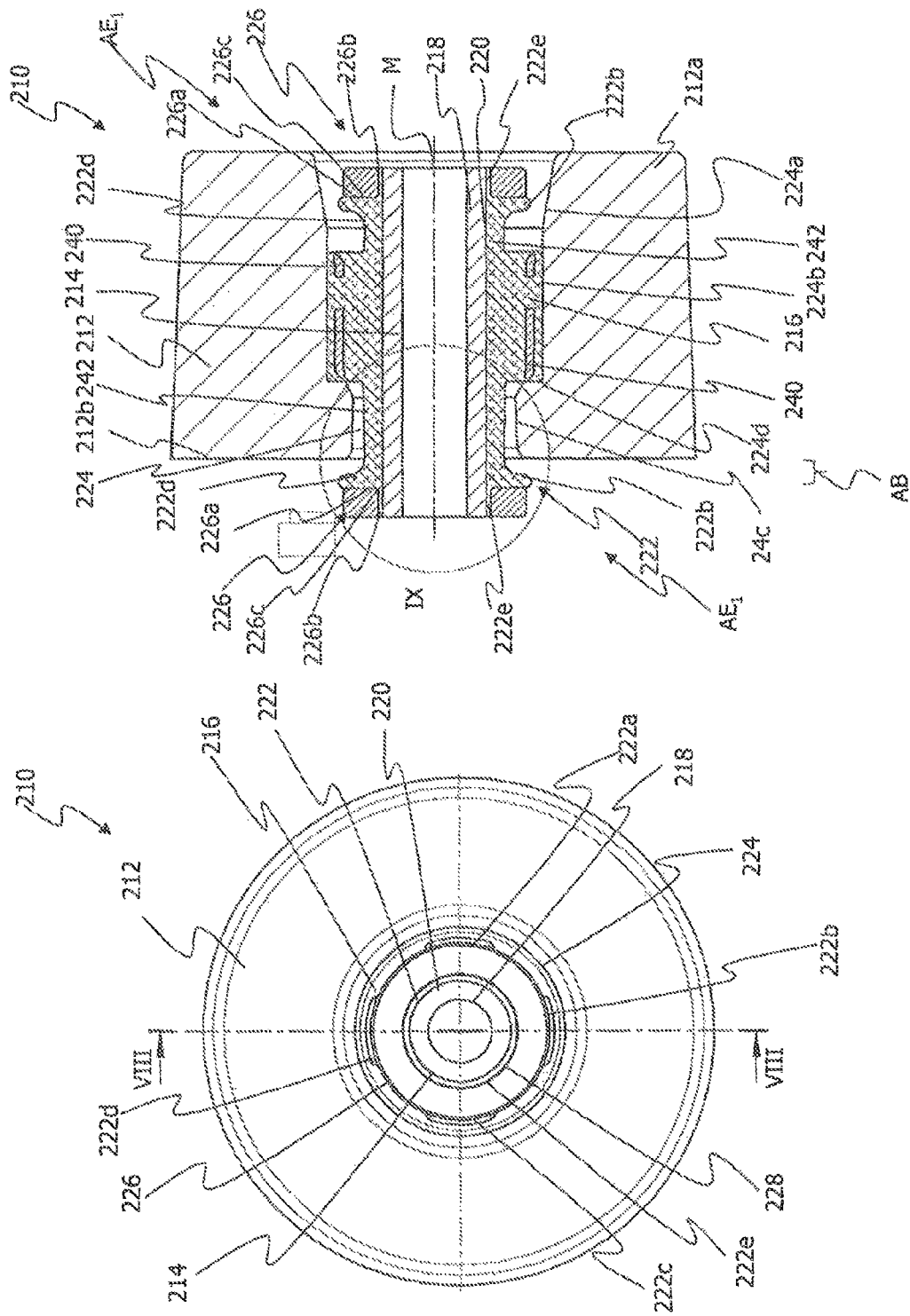

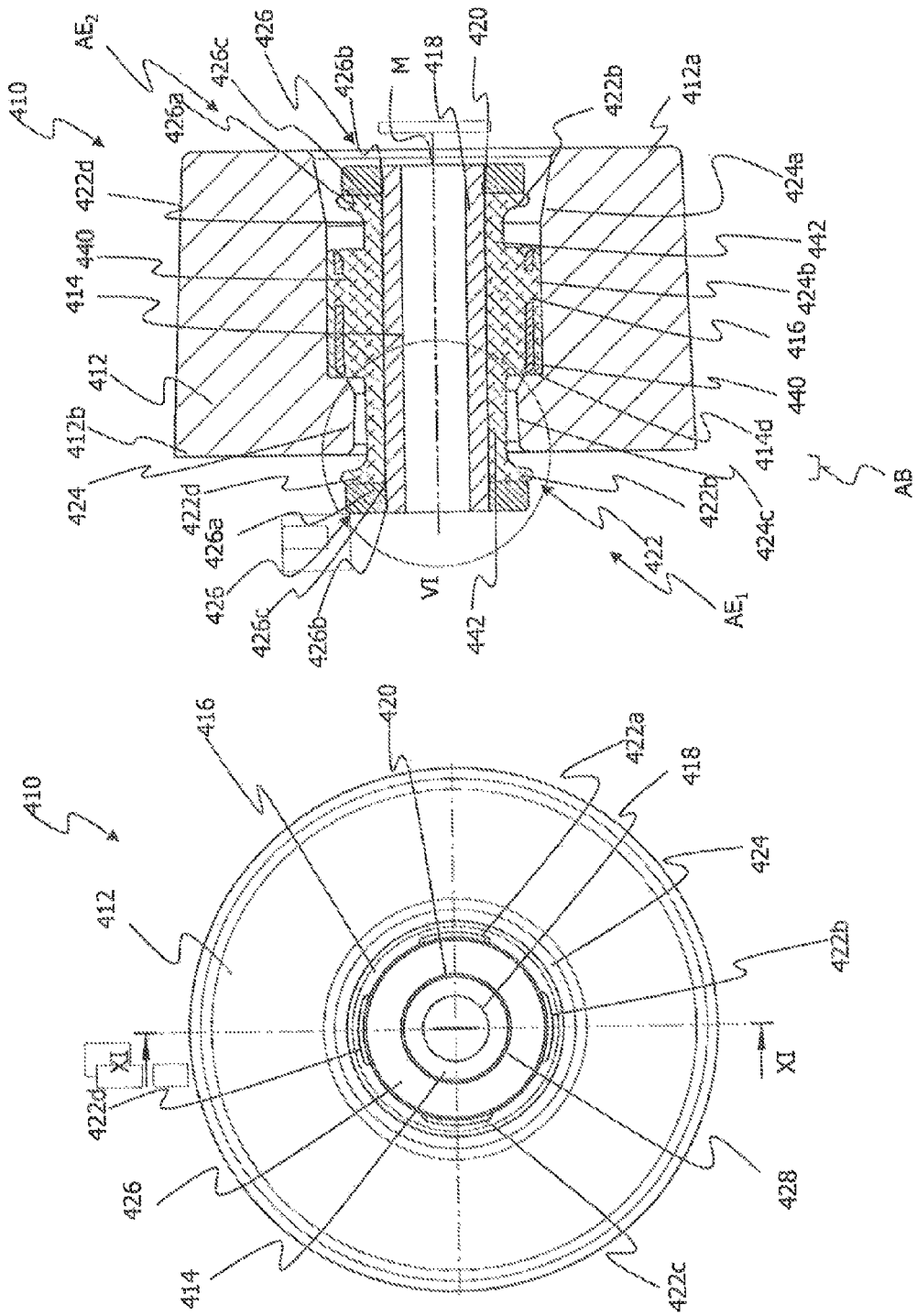

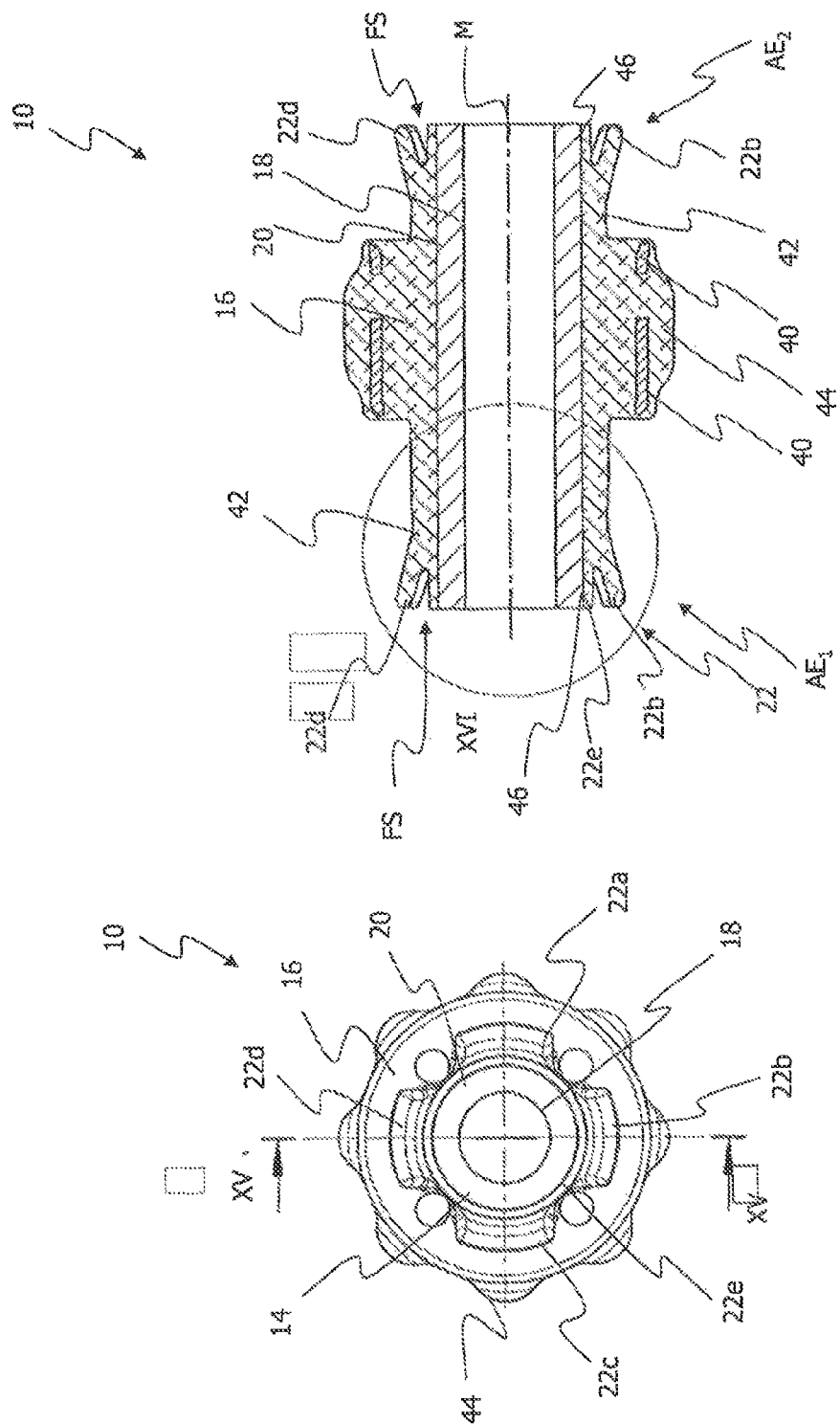

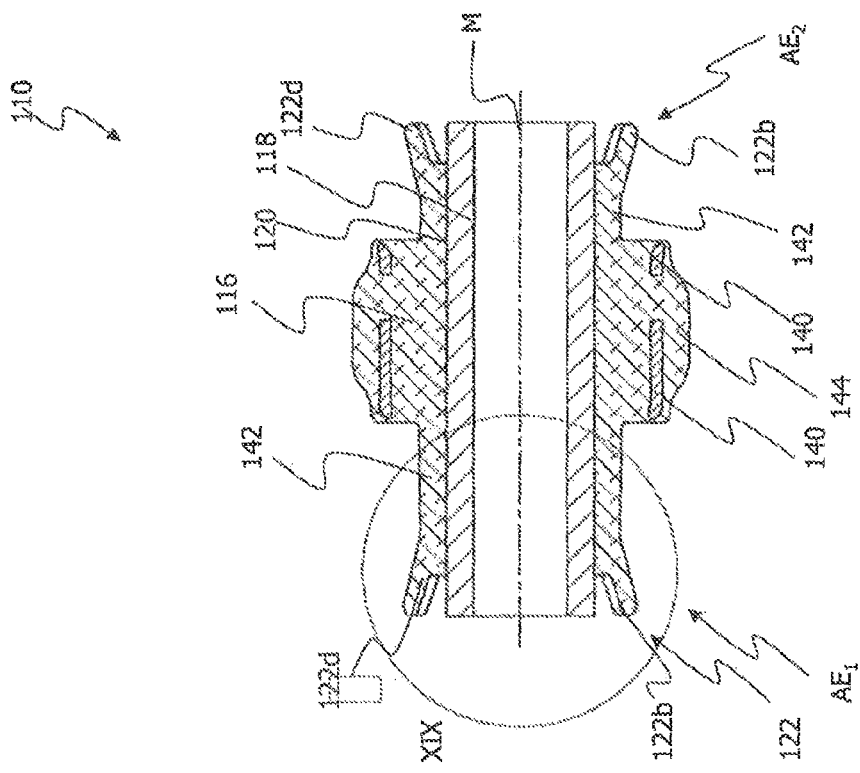
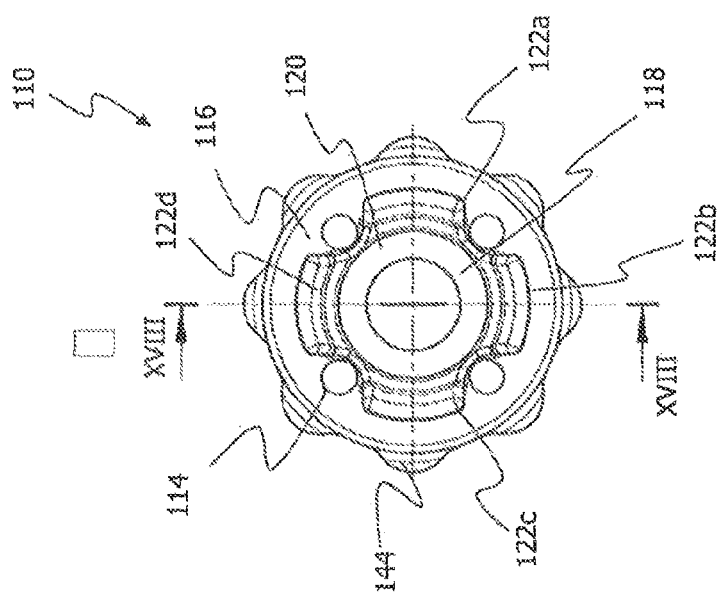
Fig. 18
Fig. 17

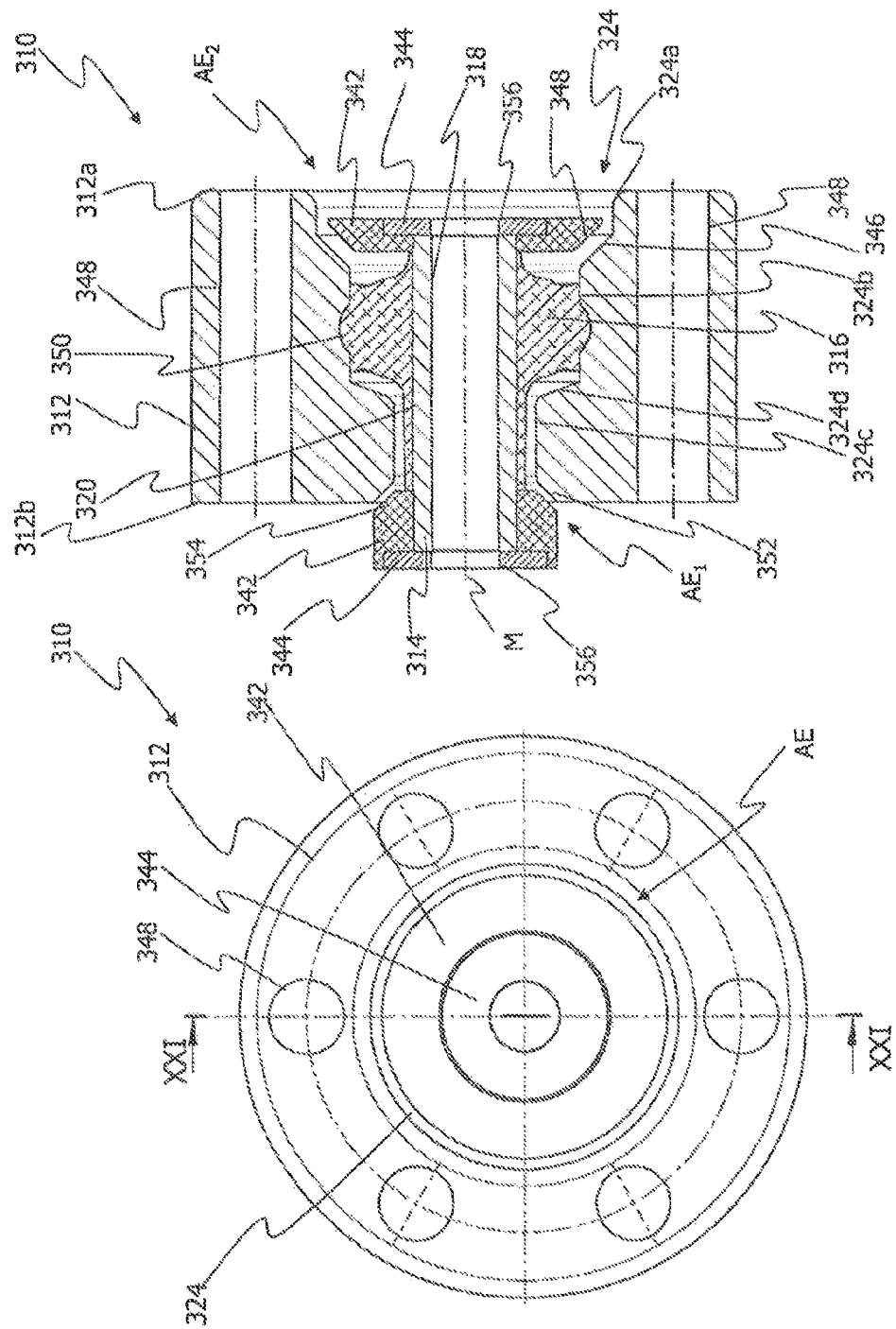

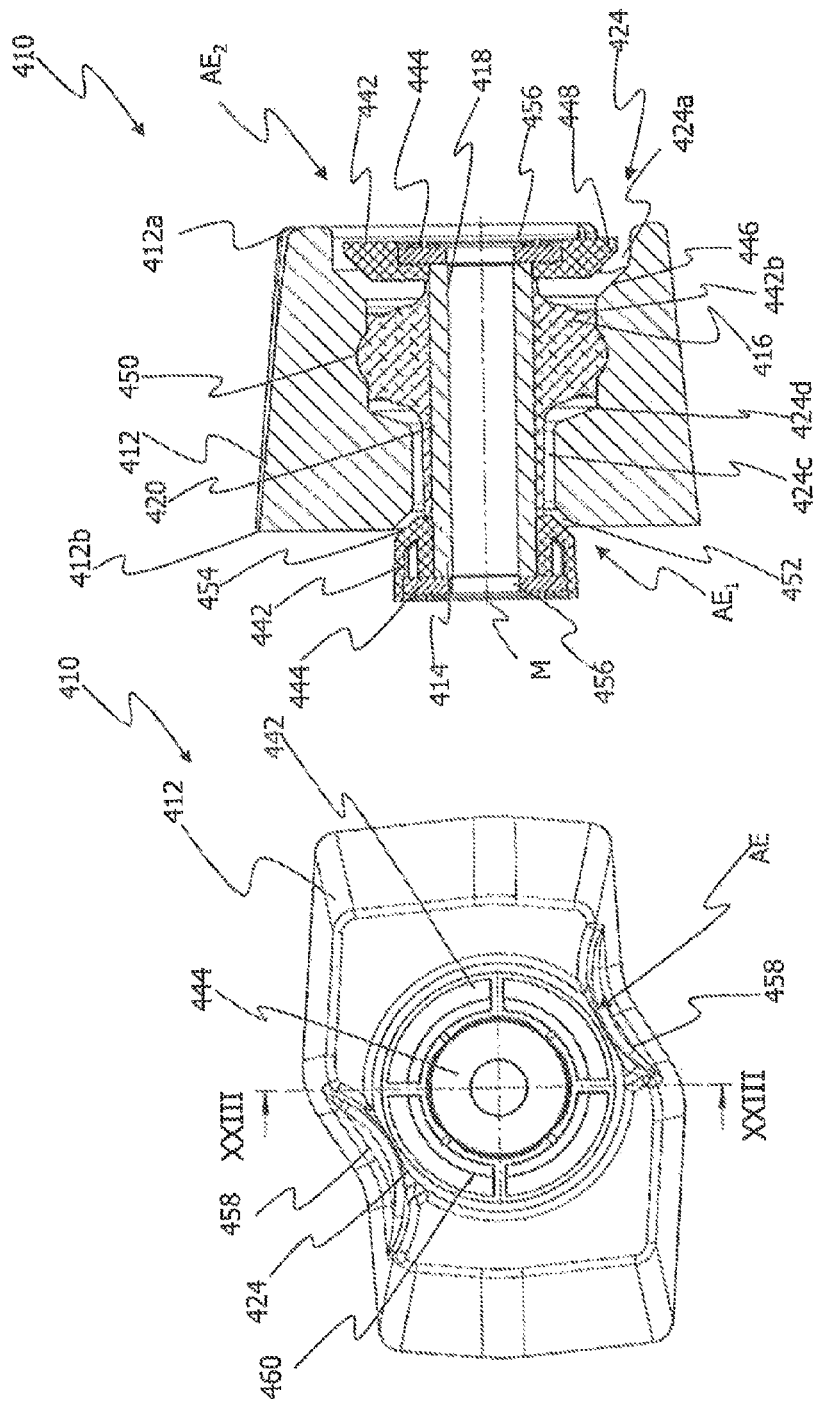

VIBRATION DAMPER

The present invention relates to a vibration damper for damping vibrations in a vehicle, in particular for damping bending vibrations.

From the prior art, vibration dampers are known in which a vibrating weight can vibrate or oscillate, for instance along a longitudinal axis of the vibration damper, in order to damp vibrations of a predetermined frequency. The vibration dampers are mostly embodied for damping bending vibrations. Such vibration dampers are used for instance for damping vibrations in the vicinity of the rear axle of a vehicle.

It is an object of the present invention to furnish a vibration damper of the type described at the outset which in terms of vibration technology and acoustically can be further improved and withstand greater loads.

This object is attained with a vibration damper of the type described at the outset, having the features of claim 1.

Further embodiments of the invention are recited in the dependent claims.

The vibration damper of the invention includes at least one vibrating weight, at least one fastening means, and at least one elastic connecting means. The at least one elastic connecting means connects the at least one vibrating weight to the at least one fastening means. Moreover, in the vibration damper of the invention, at least one stop device is provided, which in damping fashion limits a deflection of the vibrating weight along the longitudinal axis of the vibration damper.

The at least one vibrating weight, for damping bending vibrations for instance along the longitudinal axis of the vibration damper, can be deflected relative to the at least one fastening means, or can oscillate along the longitudinal axis of the vibration damper. The at least one stop device of the vibration damper damps the impact of the at least one vibrating weight.

This prevents the vibrating weight from striking components with which the vibration damper is associated or on which the vibration damper is fastened. With the vibration damper of the invention, acoustical interference caused by the impact of the vibrating weight on further components can be prevented. When the vibration damper of the invention is used in a motor vehicle in the vicinity of the rear axle, the damping action of the at least one stop device prevents the vibrating weight from being able to strike a rear axle differential or a rear axle carrier. The acoustical interference in the vehicle that arises in conventional vibration dampers from the impact of the vibrating weight on the rear axle differential or the rear axle carrier, for example, can accordingly be prevented with the vibration damper of the invention. By the damping action of the at least stop device, the mechanical loads on the stop device itself occurring upon the impact of the vibrating weight on the stop device are also reduced.

The at least one stop device limits the deflection of the vibrating weight after a predetermined permissible deflection. In this way, overloads on the at least one elastic connecting means are prevented, which is beneficial for the service life of the at least one elastic connecting means and of the vibration damper. The permissible deflection or the permissible deflection travel of the vibrating weight, in the state of repose of the vibration damper, is equivalent to a distance between a face end of the at least one vibrating weight and the at least one stop device.

The at least one stop device also serves as a loss-prevention device. The at least one stop device can secure the vibrating weight to the at least one fastening means even if the at least one elastic connecting means fails, for instance tears. As a result, the vibrating weight is prevented from falling onto the road or the like. Since the at least one stop device has damping properties, no acoustical interference occurs even if the at least one elastic connecting means fails. Even if the at least one vibrating weight is freely movable along the at least one fastening means after the failure of the elastic connecting means, no interfering noises occur when the at least one vibrating weight strikes the at least one stop device, because of its damping properties.

In one embodiment, the at least one stop device can permit a predetermined deflection of the at least one vibrating weight. Via the permissible deflection, the vibration damper can be adjusted to various vibration, amplitudes and vibration frequencies that are to be damped by the vibration damper. After the permissible deflection travel, the deflection of the at least one vibrating weight is limited, in damping fashion, by the at least one stop device.

The at least one stop device can be located on the at least one fastening means. The at least one fastening means can have the at least one elastic connecting means on its outer circumferential surface. The at least one fastening means can be embodied in tubular form. The at least one fastening means can be connected to the at least one elastic connecting means by means of vulcanization, for instance. The at least one stop device can likewise be provided on the outer circumferential surface of the at least one fastening means. The vibration damper can be mounted on the components associated with it, such as a rear axle carrier, by means of such fastening means as screws, which extend through the fastening means.

The at least one stop device can extend in the radial direction, beginning at the at least one fastening means. The length of the at least one stop device in the radial direction is selected such that the at least one vibrating weight, after exceeding the permissible deflection travel, can contact the at least one stop device or strike the stop device.

The at least one vibrating weight can be a rotationally symmetrical body, with an opening through which the at least one fastening means, together with the at least one elastic connecting means, can extend. The opening in the at least one vibrating weight can be embodied along the center axis of the at least one vibrating weight.

The at least one stop device can have at least one damping body. The at least one damping body can contribute to damping the impact of the at least one vibrating weight on the at least one stop device after the permissible deflection travel is exceeded. The at least one damping body can, like the at least one elastic connecting means, be made for instance from an elastomer, a thermoplastic elastomer, rubber, or a similar material. The at least one damping body can extend in the radial direction. The at least one damping body can be composed of a plurality of segments or struts. The segments or struts can be located at predetermined intervals about the outer circumference of the at least one fastening means. The at least one damping body, if the at least one elastic connecting means fails, by itself damps the impact of the at least one vibrating weight, which is then freely movable, on the at least one stop device. As a result, even if a connecting means is destroyed, acoustical interference in the vehicle is prevented.

Moreover, the at least one stop device can have at least one stiffening element. The at least one damping body can be located in the axial direction, beginning at the at least one vibrating weight, before the at least one stiffening element, to enable damping an impact of the at least one vibrating weight on the at least one stiffening element.

The at least one damping body can at least in some portions cover a radially extending stop face of the at least one stiffening element. If the damping body has segments or struts, then these segments or struts can each cover a predetermined portion of the stop face.

In one embodiment, the at least one stiffening element can be connected directly to the at least one fastening means. The at least one stiffening element can be firmly connected to the at least one fastening means. As a result, a relatively stiff stop device is achieved, which can withstand strong forces upon impact of the stop device.

In one embodiment, at least one portion of the at least damping body can extend between the at least one fastening element and the at least one stiffening element. In this embodiment, the at least one stop device is relatively resilient and can have damping properties, since the at least one stiffening element is itself also mounted resiliently on the at least one fastening means. In other words, the at least one stiffening element in this case can be surrounded at least in some portions by the at least one damping body.

The at least one damping body, in a refinement of the invention, can form at least one portion of the at least one elastic connecting means. The at least one damping body can be embodied integrally with the at least one elastic connecting means.

Moreover, the at least one damping body can be connected in at least some portions firmly to the at least one fastening means. In particular, the at least one damping body can be connected to the at least one fastening means via vulcanization. As already mentioned, the at least one fastening means can be embodied as tubular. In this case, the at least one damping body can at least in some portions surround the at least one fastening means. Moreover, the at least one damping body, together with the at least one elastic connecting means, can at least in some portions cover the outer circumferential surface of the at least one fastening means.

The at least one stiffening element can be embodied as annular. Moreover, the at least one stiffening element can be embodied as tubular, with an longitudinal cross section. The longitudinal cross section is composed of one radial portion and one portion extending in the axial direction. A stop face, oriented toward the at least one vibrating weight and extending in the radial direction, of the at least one stiffening element can be covered in at least portions by the at least one damping body.

The at least one stiffening element, in one embodiment, can be located on at least one axial end of the at least one fastening means. The at least one stiffening element can for instance be press-fitted onto the at least one fastening element and/or onto one portion of the at least one damping body. The at least one damping body can be embodied such that when the at least one stiffening element is mounted, the at least one damping body is at least partially "chucked" in the radial direction. As a result, at least that portion of the at least one damping body is oriented toward the at least one vibrating weight or an axial face end of the at least one vibrating weight, or in the state of repose of the vibration damper can extend virtually parallel to the face end of the vibrating weight.

After the connection, for instance via vulcanization, to the at least one fastening means, the at least one damping body can have a relatively small outer diameter. Then, the at least one fastening means can be connected, together with the at least one damping body, to the at least one vibrating weight via the at least one connecting means. For instance, the fastening means can be inserted along with the damping body into an opening in the at least one vibrating weight. After that procedure, the at least one stiffening element is mounted on the at least one damping body, or on the at least one fastening means. By means of the mounting of the at least one stiffening element, the outer diameter of the at least one damping body is increased, and the at least one damping body is erected in the radial direction. As a result, the at least one damping body and the at least one stop device assumes its intended dimensions or its intended outer circumference, which is required for securing the vibrating weight to the fastening element and for damping the impact of the at least one vibrating weight.

At least one element of a further material can be embedded in the at least one elastic connecting element. The at least one element of a further material can serve the purpose of coupling to the at least one vibrating weight.

The at least one elastic connecting element can have at least one protrusion on its outer surface. The at least one protrusion serves to prestress the connecting element. When the at least one vibrating weight is mounted on the at least one connecting element, the at least one protrusion is compressed and thereby prestresses the connecting element in the radial direction.

In one embodiment, the stop device can comprise at least one stop bush and at least one positioning element. The positioning element can be in the shape of a disc. The at least one positioning element is arranged for positioning the stop bush in its predetermined position at the fastening element. The at least one stop bush can be made from another material as the at least one positioning element. The at least one stop bush can be mounted on an axial end of the at least one fastening element.

At the at least one stop bush, at least one stop surface can be formed, which interacts with a stop surface at the at least one vibrating weight. The stop surfaces at the least one stop bush and the vibrating weight are arranged to limit the displacement of the vibrating weight relative to the fastening element, i.e., relative to the at least one stop device. The stop surfaces at the at least one stop bush and the at least one vibrating weight extend oblige to the center axes of the fastening element.

The at least one positioning element can abut at one axial end surface of the at least one fastening element. The at least one positioning element can be received in the at least one stop bush. The stop bush can be made, for example, of plastic material or an elastomeric material. The at least one positioning element can be made of metal. By means of the at least one positioning element, the stop bush can be positioned in its predetermined position at the fastening element. The predetermined position of the stop bush, i.e. the stop device is reached, when the positioning elements abuts with one of its axial faces at one axial end face of the fastening element. Embodiments of the invention are described as examples below in conjunction with the appended drawings.

IN THE DRAWINGS

FIG. 1 is a front view of a vibration damper in a first embodiment of the invention;

FIG. 2 is a sectional view along the line II-II in FIG. 1;

FIG. 4 is a front view of a vibration damper in a second embodiment of the invention;

FIG. 5 is a sectional view along the line V-V in FIG. 4;

FIG. 7 is a front view of a vibration damper in a third embodiment of the invention;

FIG. 8 is a sectional view along the line VIII-VIII in FIG. 7;

FIG. 10 is a front view of a vibration damper in a fourth embodiment of the invention;

FIG. 11 is a sectional view along the line XI-XI in FIG. 10;

FIGS. 14-16 are views of a base body of a vibration damper in the first and third embodiments; and FIGS. 17-19 are views of a base body of a vibration damper in the second and fourth embodiments.

FIG. 20 is a front view of a vibration damper in a fifth embodiment of the invention;

FIG. 21 is a sectional view along the line XXI-XXI in FIG. 20;

FIG. 22 is a front view of a vibration damper in a sixth embodiment of the invention; and FIG. 23 is a sectional view along the line XXII-XXIII in FIG. 22.

FIG. 1 shows a front view of a vibration damper 10 in a first embodiment of the invention.

Figure 3:
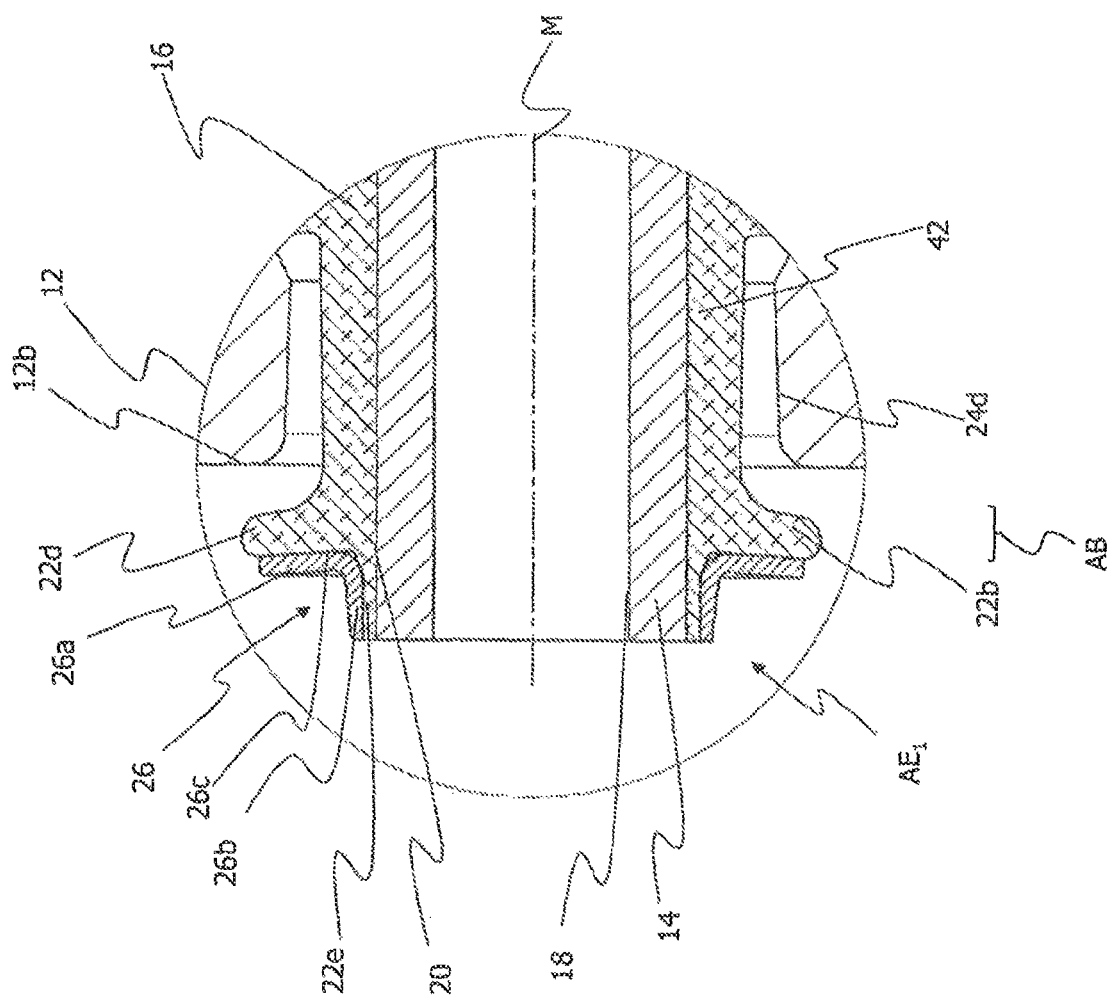
FIG. 3 is a fragmentary view of the detail marked III in FIG. 2.

The vibration damper 10 includes a vibrating, weight 12 and a fastening element 14, which are connected to one another via an elastic connecting element 16. For damping vibrations, the vibrating weight 12 can be deflected relative to the fastening element 14.

The fastening element 14 is embodied in tubular form and has an opening 18. The elastic connecting element 16 and a damping body 22 are provided on the outer circumferential surface 20 of the fastening element 14. Both the fastening element 14 and the elastic connecting element 16 are located or in other words received in an opening 24 of the vibrating weight 12. An annular stiffening element 26 is moreover located on the fastening element 14. Four portions 22a, 22b, 22c, and 22d of the damping body 22 protrude past the outer circumferential edge of the stiffening element 26 in the radial direction and are able to limit a deflection of the vibrating weight 12 in damping fashion. The portions 22a, 22b, 22c, and 22d of the damping body 22 are offset from one another by predetermined angular intervals about the outer circumference of the fastening element 14. The damping bodies 22 and the stiffening element 26 together form a stop device AE for the vibrating weight 12. Between the outer circumferential surface 20 of the fastening element 14 and an inner circumferential surface 28 of the stiffening element 26, a portion 22e of the damping bodies 22 can be seen, which encompasses and covers the outer circumferential surface of the fastening element 14.

FIG. 2 shows a sectional view along the line II-II in FIG. 1.

In FIG. 2, it can be seen how the vibrating weight 12 is connected to the fastening element 14 via the elastic connecting element 16.

In this embodiment, the stiffening element 26 is embodied as annular and has an longitudinal cross section. The longitudinal cross section is formed by a radial portion 26a and an axially extending portion 26b. A face 26c, oriented toward the vibrating weight 12, of the radial portion 26a forms a stop face for the vibrating weight 12. The face 26c is covered in some portions by the damping body 22 or the damping body portions 22b and 22d. In the direction of the center axis M of the vibration damper 10, the damping bodies 22 are located between the vibrating weight 12 and the face 26c of the stiffening elements 26 on the face 26c. As a result, the damping bodies 22 can, in damping fashion, limit a deflection of the vibrating weight 12 along the axis M, after a permissible deflection (distance AB) has been exceeded. A further portion 22e of the damping body 22 extends between the axially extending portion 26b of the stiffening element 26 and the outer circumferential surface 20 of the fastening element 14. The portion 22e of the damping body 22 serves to connect the radial or tubular portion 26b of the stiffening element 26c to the fastening element 14. When the stiffening elements 26 are being mounted, the portion 22d, 22b of the damping body 22 is chucked so that it extends in the radial direction, as shown in FIG. 2. The stiffening element 26 is supported resiliently, as it were "in floating fashion," on the fastening element 14 via the damping body 22 and its portion 22e.

The opening 24 through the vibrating weight 12 has a plurality of portions 24a, 24b and 24c. The portion 24a extends from the face end 12a of the vibrating weight 12 conically to the portion 24b, which extends parallel to the center axis M. The portion 24b is defined by a shoulder 24d, which merges with the portion 24c. The portion 24c has a smaller diameter than the portion 24b, but it too extends substantially parallel to the center axis M. The portion 24c may, however, also be embodied slightly conically, and they open in the direction of the end face 12b.

The elastic connecting element 16 contacts the shoulder 24d; that is, the shoulder 24d serves to couple the elastic connecting element 16 to the vibrating weight 12. In the vicinity of the shoulder 24d, the elastic connecting element 16 has stiffening elements 26 of a further material, such as a metal. These stiffening elements 26 of a further material serve to adjust the elastic connecting element 16 and can be braced on the shoulder 24d. The stiffening elements 26 are located radially in a region of the elastic connecting element 16 that is located between the diameter of the portion 24b of the opening 24 of the vibrating weight and the portion 24c. The stiffening elements 26 are located radially inside the radial extension of the shoulder 24d.

The stop device $AE_1$ is located outside the vibrating weight 12 in the axial direction, or in the axial direction on the left beside the face end 12b of the vibrating weight 12. The stop device $AE_2$ is located inside the opening 24 in the vibrating weight 12. The stop device $AE_2$ is located in the portion 24a of the opening 24. The face end or end face 12b of the vibrating weight 12, after the permissible deflection is exceeded, can strike the damping body 22, or the stop face 26c. Via the damping body 22, this impact is damped and the deflection is simultaneously limited. The permissible deflection of the vibrating weight 12 is equivalent to the distance AB between the end face 12b and the stop device $AE_1$ in the state of repose of the vibration damper 10. In the state of repose of the vibration damper 12, the end faces 12a and 12b extend perpendicular to the axis M.

If the vibrating weight 12 is deflected in the direction of the stop device $AE_2$, the deflection is limited via the elasticity of the elastic connecting element 16. If the elastic connecting element 16 should tear, the vibrating weight 12 is still retained on the fastening element 14, via the stop device $AE_2$. In that case, the shoulder 24d strikes the damping body 22 and the stop face 26c of the stop device $AE_2$. As a result, the vibrating weight 12 is retained on the fastening element 14.

The damping bodies 22 are connected via connecting portions to the elastic connecting element 16. Thus the damping bodies 22 are embodied integrally with the elastic connecting element 16 and, together with the connecting element 16, they completely cover the outer circumferential surface 20 of the fastening element 14.

FIG. 3 shows an enlarged view of the detail marked III in FIG. 2.

The portions 22b and 22d of the damping body 22 face toward the end face 12b of the vibrating weight 12, so that they are able, in damping fashion, to limit an impact of the vibrating weight 12, once the permissible deflection is exceeded. The damping bodies 22 or in other words the portions 22b and 22d cover the stop face 26c of the radial portion 26b of the stiffening elements 26. The portion 22e of the damping body 22 is provided between the axially extending tubular portion 26b of the stiffening elements 26 and the outer circumferential surface 20 of the fastening element 14. The portion 22e of the damping body connects the portion 26b to the fastening element 14. The portion 22e completely surrounds the outer circumferential surface 20 of the fastening element. The elastic connecting element 16 is connected to the damping bodies 22 via the connecting portions and extends along the outer circumferential surface 20 of the fastening element 14. The fastening element 14 includes an opening 18, which can serve to receive fastening elements for the vibration damper 10 on further components.

The stiffening element 26 is embodied as L-shaped in cross section and, as already mentioned, it includes the radial portion 26a having the stop face 26c and also includes the tubular portion 26b.

Further embodiments of the invention will be described hereinafter. Components and features that are identical and have the same effect are provided with the same reference numerals, but with a further digit preceding them.

Figure 6:
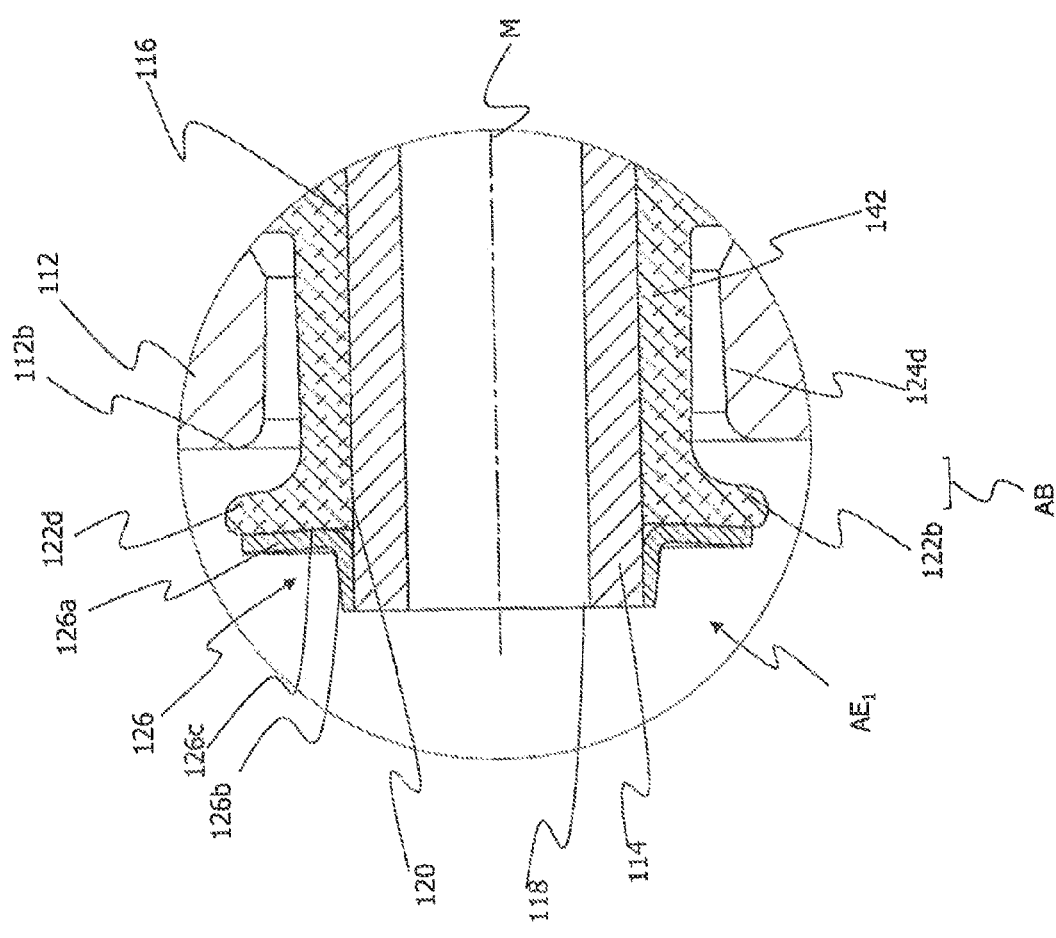
FIG. 6 is a view of the detail marked VI in FIG. 5.

FIGS. 4 through 6 show a vibration damper 110 in a second embodiment of the invention.

The essential distinction between this embodiment and the embodiment described in conjunction with FIGS. 1 through 3 is that the damping bodies 122 in this embodiment do not have a portion 22e.

The stiffening elements 126 include the radial portion 126a, having the stiffening face 126c, and the tubular portion 126b. The tubular portion 126b in this embodiment is connected directly and firmly to the outer circumferential surface 120 of the fastening element 114. The tubular portion 126b can be press-fitted, for instance, onto the outer circumferential surface 20 of the fastening element 14.

The stop devices $AE_1$ and $AE_2$ in this embodiment are less resilient than the stop device AE in the first embodiment, since the tubular portion 126b is connected firmly and directly to the fastening element 114.

Figure 9:
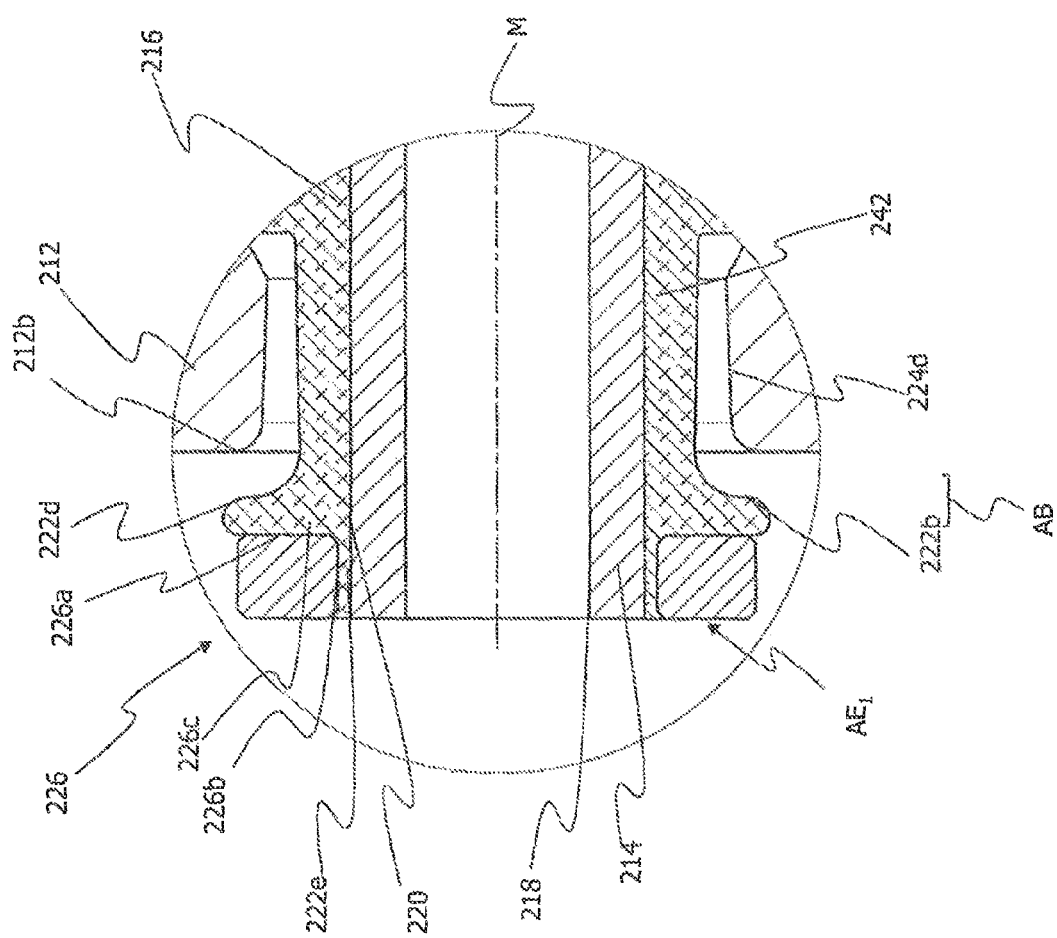
FIG. 9 is a view of the detail marked IX-IX in FIG. 8.

FIGS. 7 through 9 show views of a vibration damper 210 in a third embodiment of the invention.

The third embodiment of the invention differs from the embodiment described in conjunction with FIGS. 1 through 3 solely in the design of the stiffening elements 226. In this embodiment, the stiffening elements 226 are embodied radially and have a square cross section. The radially extending face 226c again serves as a stop face and is covered at least in some portions by the damping body 222, or in other words by the portions 222b and 222d of the damping body 222. The portion 222e of the damping body 222 is provided between the axially extending face 226b and the outer circumferential surface 220 of the fastening element 214. The portion 222e connects the face 226b to the outer circumferential surface 220 of the fastening element 214.

The annular stiffening element 26 is mounted resiliently, via the portion 222e, on the outer circumferential surface 220 of the fastening element 214.

Figure 12:
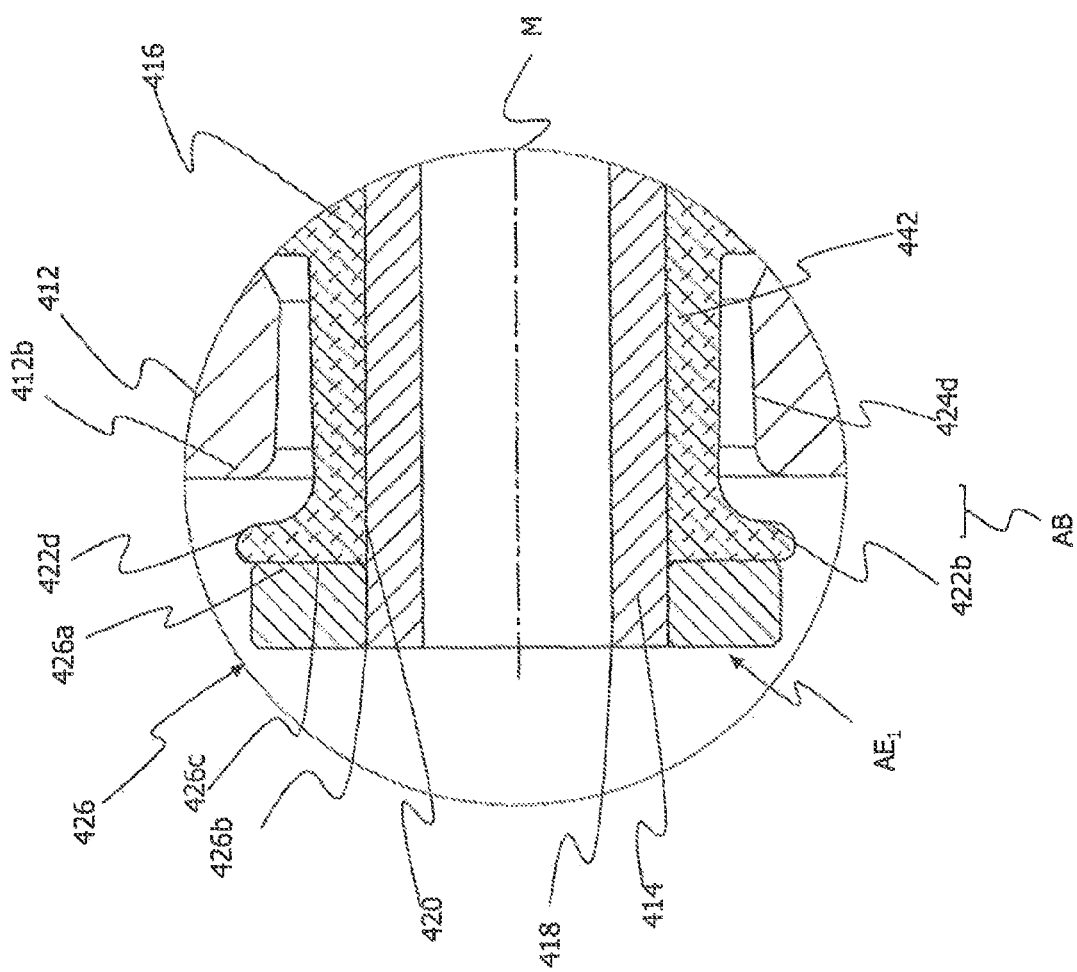
FIG. 12 is a view of the detail marked XII in FIG. 11.

FIGS. 10 through 12 show views of a vibration damper 310 in a fourth embodiment of the invention. The fourth embodiment is extremely extensively equivalent to the third embodiment described in conjunction with FIGS. 7 through 9. In this fourth embodiment, the face 326b, which extends in the axial direction, is connected firmly and directly to the outer circumferential surface 320 of the fastening element 314. No portion of the damping body 322 extends between the face 326b and the outer circumferential surface 320 of the tubular element 314.

Once again, the stiffening elements 326 are embodied as annular and are square in cross section.

Figure 13:
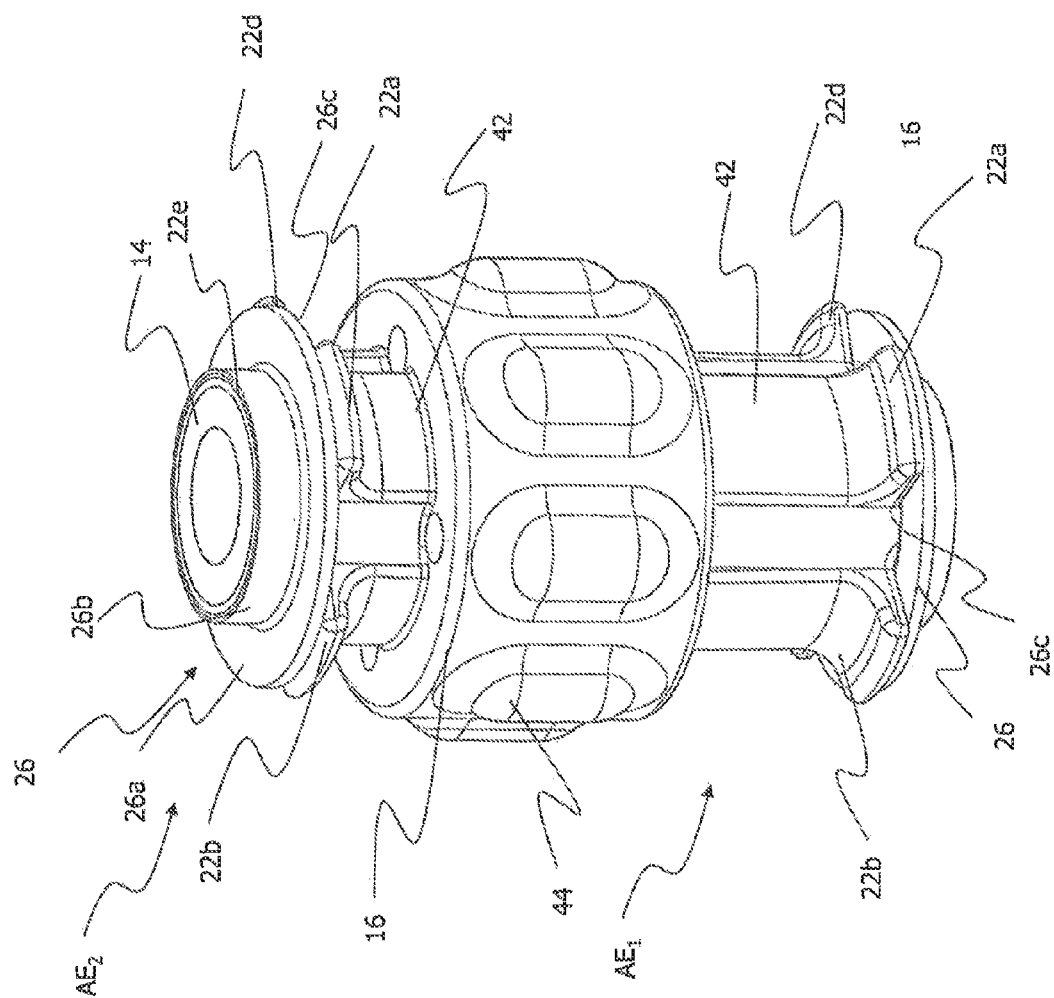
FIG. 13 is a perspective view of a vibration damper without a vibrating weight.

FIG. 13 shows a perspective view of a vibration damper 10 as in the first embodiment, but without the vibrating weight.

The vibration damper 10 includes the stop devices AE.sub.1 and AE.sub.2 as well as the elastic connecting element 16. Nubs or protrusions can be seen on the outer circumference of the elastic connecting element 16; they serve the purpose of coupling to the vibrating weight, which is not shown in FIG. 13.

It becomes clear in FIG. 13 that the stop device $AE_1$ is farther away from the connecting element 16 than the stop device $AE_2$ is. This is due to the fact that the portion 24c of the opening 24 in the vibrating weight 12 has to be received between the connecting means 16 and the stop device $AE_1$ (for this see FIG. 2, for example).

The connecting portions between the damping bodies 22 and the elastic connecting element 16 are embodied in strut-like fashion and merge with the four portions or segments 22a, 22b and 22d (portion 22c is not shown) of the damping body 22.

The stiffening elements 26 are embodied as L-shaped in cross section. The stop face 26 provided on the radial portion 26a is covered in at least some portions by the damping body portions 22a, 22b and 22d.

Between the tubular portion 26b and the fastening element 14, the portion 22e of the damping body 22 can be seen, which connects the tubular portion 26b to the fastening element 14. The portion 22e surrounds the outer circumferential surface 20 of the fastening portion 14 completely.

Figure 16:
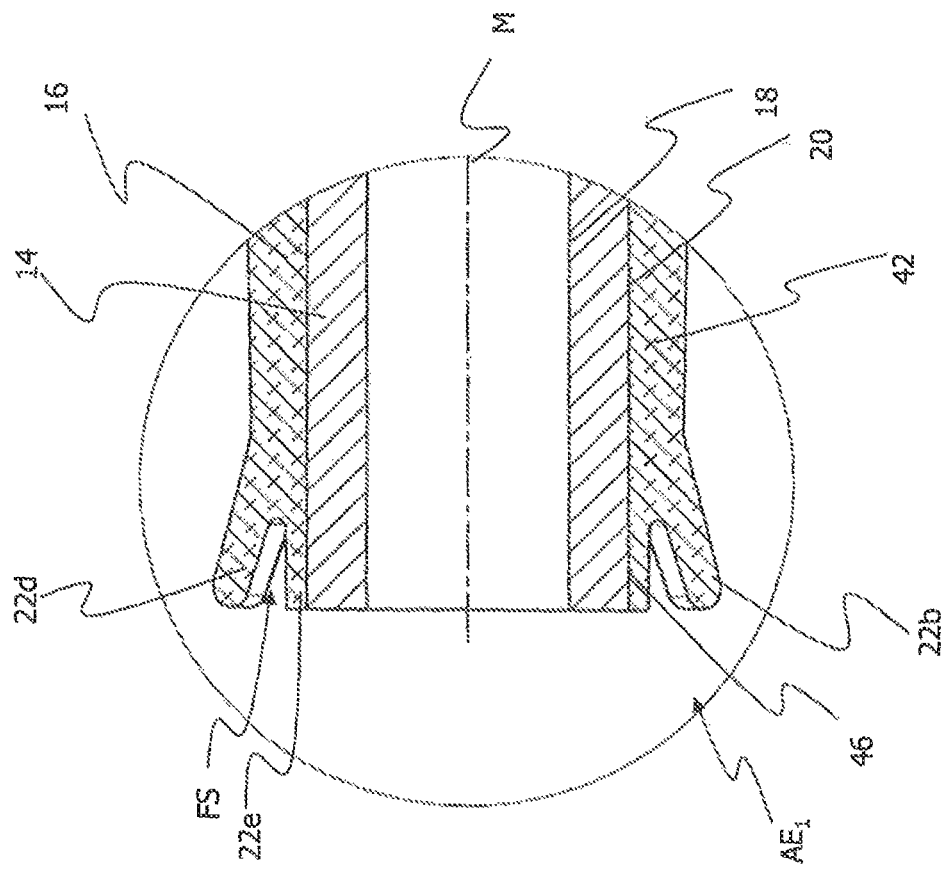

FIGS. 14 through 16 show a base body of the vibration dampers 10, 210 in the first embodiment and the third embodiment.

In this embodiment, the outer circumferential surface 20 of the fastening element 14 is covered completely by the damping bodies 22, the connecting portions, and the connecting element 16. In particular, the portion 22e of the damping body 22 should be emphasized, which spans the outer circumferential surface 20, including in the axial end portions 36, of the fastening element 14. The portion 22e extends all the way around the outer circumferential surface 20 of the fastening element 14. Between the portion 22e and the portions 22b and 22d of the damping body, a free space FS can be seen, into which the stiffening elements 26 are inserted by press fitting. As a result of the press-fitting insertion of the stiffening elements 26, the portions 22b and 22d are chucked, so that they extend radially and virtually perpendicular to the axis M. The portion 22e serves to connect the stiffening elements 26 to the outer circumferential surface 20 of the fastening element 14. Once again, the protrusions are provided for prestressing the elastic connecting element 16 in the radial direction; that is, the protrusions become compressed when the vibrating weight 12 is press-fitted on.

Figure 19:
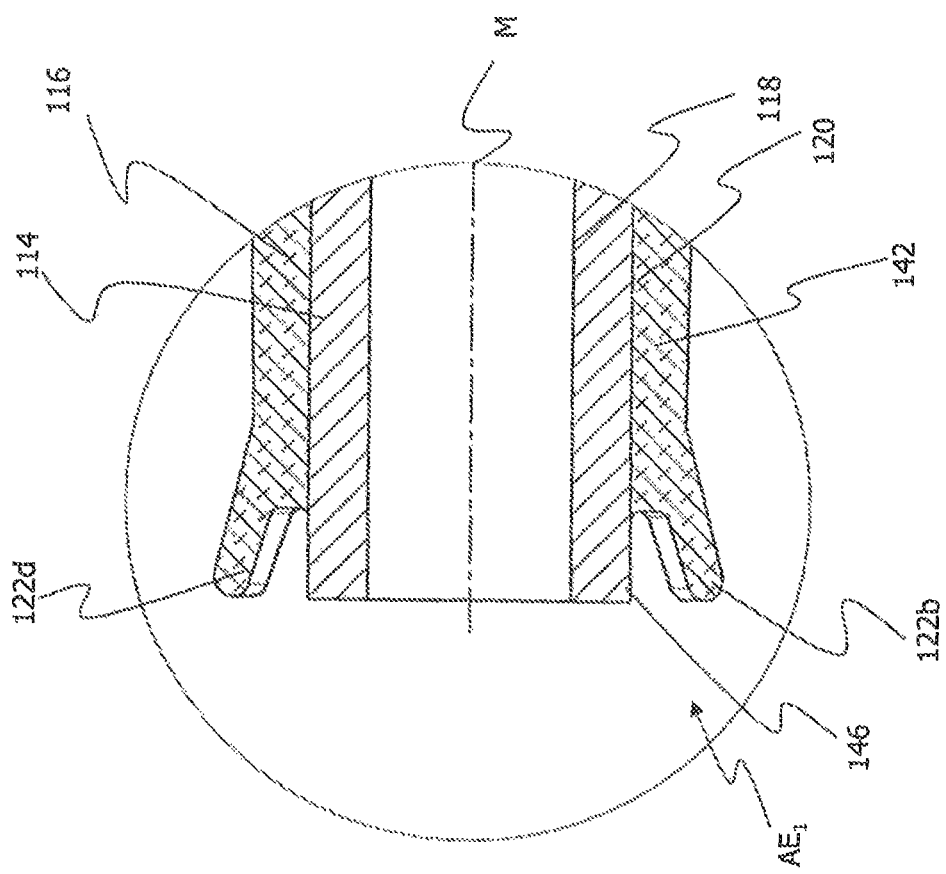

FIGS. 17 through 19 shows views of a base body of the vibration dampers 110 and 310 in the second and fourth embodiments, that is, without the stiffening elements 126 and without the vibrating weight 112.

The connecting element 116 has protrusions, which, in the connection of the connecting element 116 to the vibrating weight 112, serve to prestress the connecting element 116 in the radial direction; that is, via the protrusions, the elastic connecting element 116 can be prestressed in the radial direction.

The elastic connecting element 116 with its connecting portions and the damping bodies 122 can be connected to the fastening element 114, for instance by way of vulcanization. In the elastic connecting element 116, the stiffening elements 126, which serve the purpose of coupling to the contact shoulder 124*d* of the opening 124 (see for instance FIG. 5), can also be seen.

The damping bodies 122*b* and 122*d* extend, without the stiffening elements 126, obliquely to the center axis M. The axial end portions 136 of the tubular fastening element 114 are not covered, in this embodiment, by the damping bodies 122 but instead serve the sole purpose of direct connection to the stiffening element 126. Accordingly, in the axial end region 136 the outer circumferential surface 120 is out in the open. The free space thus extends between the portions 122*b* and 122*d* of the damping bodies 122 and the portion 136 of the outer circumferential surface 120 of the fastening element 214.

In FIG. 18, it can be seen that the damping body portions 122*b* and 122*d* in FIG. 18 extend obliquely to the center axis M. Upon mounting of the stiffening elements 126, the damping bodies 122, or in other words the portions 122*b* and 122*d*, are chucked (see FIG. 5), so that they extend in the radial direction and extend virtually perpendicular to the center axis M. It is thereby ensured that the damping bodies 122 are able, in damping fashion, to limit the impact of the vibrating weight 112.

FIGS. 14 through 19 show the state prior to the connection of the fastening elements 14, 114 and connecting elements 16, 116 to the vibrating weight 12, 112. In this state, the damping bodies 22, 122 have a lesser length or a lesser outer diameter in the radial direction than is shown in FIGS. 1 through 13. As a result, the damping bodies 22, 122, together with the connecting elements 16, 116 and the fastening element 14, 114, can be inserted into the opening 24, 124 in the vibrating weight 12, 112 and thereby be connected to the vibrating weight 12, 112. Next, the stiffening elements 26, 126 are mounted on the damping bodies 22, 122, or in other words on the fastening element 14, 114. As a result, the damping bodies 122, or in other words their portions 22*a*, 22*b*, 22*c*, 22*d*, 122*a*, 122*b*, 122*c*, 122*d* are erected in the radial direction, and the dimensions of the stop devices $AE_1$, $AE_2$ in the radial direction, or in other words the outer diameter of the stop devices $AE_1$, $AE_2$, are increased in such a way that the stop devices $AE_1$, $AE_2$ are able to damp an impact on the end face 12*b*, 112*b* of the vibrating weight 12, 112 and to secure the vibrating weight 12, 112 to the fastening element 14, 114.

FIG. 20 shows a front view of a vibration damper 310 in a fifth embodiment of the invention.

The vibration damper 310 comprises a vibrating weight 312, which includes an opening 324. In the opening 324, a stop device AE is received, which is connected to a fastening element not shown in FIG. 20. The vibrating weight 312 comprises openings 348 of offset to one another in circumferential direction, which openings 348 are arranged radially outwardly of the opening 324 and around the opening 324.

The stop device AE comprises a stop bush 342 and a positioning disc 344. The positioning disc 344 is received in the stop bush 342 and serves for positioning the stop device AE.

FIG. 21 shows a sectional view along the line XXI-XXI in FIG. 20.

The vibrating weight 312 is connected by an elastic connecting element 316 to the tubular fastening element 314. The elastic connecting element 316 is provided at the outer circumferential surface 320 of the fastening element 314. At the axial ends of the fastening element 314, the stop devices $AE_1$ and $AE_2$ are arranged. The stop devices $AE_1$ and $AE_2$ comprise the stop bushes 342 and the positioning discs 344 received in the stop bushes 342. The positioning discs 344 abut at the axial end faces of the fastening element 314, when the stop devices $AE_1$ and $AE_2$ are their predetermined positions at the fastening element 314, respectively. In other words, in case the positioning discs 344 abut at the axial end faces of the fastening element 314, the predetermined positions of the stop devices $AE_1$ and $AE_2$ at the fastening element 314 are reached. Between the stop devices $AE_1$ and $AE_2$ extends in axial direction the elastic connecting element 316, which covers the outer circumferential surface 320 of the fastening, element 314.

The opening 324 in the vibrating weight 312 comprises several portions 324*a*, 324*b* and 324*c*. In the portion 324*a*, the stop device AE2 is received. The portion 324*a* includes a stop face 346, which interacts with a stop face 348 at the stop bush 342. The stop face 346 connects to the portion 324*b*, which extends in parallel to the center axis M. In the portion 324*b* a recess 350 is formed, into which the elastic connecting element 316 extends and which provides a connection between the elastic connecting element 316 and the vibrating weight 312. The portion 324*b* connects to the portion 324*c*, which extends in parallel to the center axis M as well. Between the portions 324*b* and 324*c*, a shoulder 324*d* is formed such that the portion 324*c* has a smaller diameter as the portion 324*b*. Between the portion 324*c* and the face end 312*b* of the vibrating weight 312 extends a stop face 352 oblige to the center axis M.

The stop face 352 interacts with the stop face 354 at the stop bush 342 of the stop device $AE_1$.

Through the vibrating weight 312 extend openings 333 in axial direction.

In the discs 344 of the stop devices $AE_1$ and $AE_2$, openings 356 are formed, through which a fastening means (not shown) for fastening the vibration damper 310 to a drive or driven component (not shown) may be inserted. The stop devices $AE_1$ and $AE_2$ are dimensioned and adapted to the respective portion of the opening 324 that such the stop devices $AE_1$ and $AE_2$ are able to keep the vibrating weight 312 at the fastening element 314, although the elastic connecting element 316 is destroyed.

In case the vibrating weight 312 is moved in direction of the stop device $AE_2$, the movement is limited by an impact of the stop face 346 at the stop face 348 of the stop bush 342. In the same way, a movement of the vibrating weight 312 in direction of the stop device $AE_1$ is limited by means of an impact of the stop face 352 at the stop face 354 of the stop bush 342.

FIG. 22 shows a front view of a vibration damper 410 in a sixth embodiment of the invention.

The vibrating weight 412 of the vibration damper 410 is not annular shaped, but unregular. At the vibrating weight 412 landings 458 are formed. The vibrating weight 412 comprises an opening 424, in which the stop device AE is received. The stop device AE is connected to a fastening element (not shown). The stop device AE comprises a stop bush 442 and a positioning disc 444, which serves for positioning the stop device. The stop device 442 comprises indentations 460, which are arranged offsett to one another around the positioning disc 444.

FIG. 23 shows a sectional view along the line XXIII-XXIII in FIG. 22.

The stop devices $AE_1$ and $AE_2$ comprise stop bushes 442 and the positioning discs 444, which abut at the axial end faces of the tubular fastening element 414, in order to position the stop bushes 442 in their predetermine position. The structure of the stop devices $AE_1$ and $AE_2$ is substantially the same as the structure of the stop devices $AE_1$ and $AE_2$ of the above discussed embodiment.

The vibrating weight 412 comprises an opening 442, in which the fastening element 414 and the elastic connecting element 416 are received. In the portion 424a of the opening 424, the stop device $AE_2$ is received. The portion 424a includes a stop face 446 extending oblige to the center axis M, which stop face 446 interacts with a stop face 448 at the stop bush 442. In the portion 424b, a recess 450 is provided, by means of which the elastic connecting element 416 provides a connection to the vibrating weight 412. The portion 424c is connected to the portion 424b by the shoulder 424d. The portion 424c connects to the stop face 452, which interacts with the stop face 454 at the stop bush 442. The axial section between the stop devices $AE_1$ and $AE_2$ of the fastening element 414, i.e. in the section of the outer circumferential surface 420 of the fastening element 414, is covered by the elastic connecting element 416.

The invention claimed is:

1. A vibration damper for damping vibrations in a vehicle, in particular for damping bending vibrations, having:
   at least one vibrating weight;
   at least one fastening means;
   at least one elastic connecting means, which connects the at least one vibrating weight to the at least one fastening means; and
   stop devices, each stop device comprises at least one stop bush and at least one positioning element, wherein the stop devices, in damping fashion, limit a deflection of the vibrating weight along a longitudinal axis of the vibration damper, and wherein the stop devices are arranged at opposite axial ends of the at least one fastening means.

2. The vibration damper of claim 1, wherein the stop devices allow a predetermined deflection of the at least one vibrating weight, before it limits the deflection of the at least one vibrating weight in damping fashion.

3. The vibration damper of claim 1, wherein the stop devices are located on the at least one fastening means.

4. The vibration damper of claim 1, wherein the stop devices extend in the radial direction, beginning at the at least one fastening means.

5. The vibration damper of claim 1, wherein the at least one stop bush comprises a stop face, which interacts with at least one stop face of the vibrating weight.

6. The vibration damper of claim 1, wherein the at least one positioning element is received in the at least one stop bush and abuts at one of the axial end faces of the at least one fastening element.

7. A vibration damper for damping vibrations in a vehicle, in particular for damping bending vibrations, having:
   at least one vibrating weight;
   at least one fastening means;
   at least one elastic connecting means, which connects the at least one vibrating weight to the at least one fastening means; and
   stop devices, each stop device comprises at least one dampening body and at least one stiffening element, wherein the stop devices, in damping fashion, limit a deflection of the vibrating weight along a longitudinal axis of the vibration damper and, wherein the stiffening elements of the stop devices are located on opposite axial end regions of the at least one fastening means.

8. The vibration damper of claim 7, wherein the at least one damping body covers at least one stop face, extending in the radial direction, of the at least one stiffening element, at least in some portions.

9. The vibration damper of claim 8, wherein the at one stiffening element is connected directly to the at least one fastening means.

10. The vibration damper of claim 8, wherein at least one portion of the at least one damping body extends between the at least one fastening means and the at least one stiffening element.

11. The vibration damper of claim 7, wherein the at least one damping body forms at least one portion of the at least one elastic connecting means.

12. The vibration damper of claim 7, wherein the at least one damping body is connected, via vulcanization, to the at least one fastening means.

13. The vibration damper of claim 7, wherein the at least one stiffening element is embodied as annular or tubular.

14. The vibration damper of claim 7, wherein at least one element of a further material, which serves for coupling to the at least one vibrating weight, is embedded in the at least one elastic connecting means.

15. The vibration damper of claim 7, wherein the at least one stiffening element has at least one protrusion, which serves to pre-stress the stiffening element.

* * * * *